United States Patent

Ondraka

[15] 3,658,350
[45] Apr. 25, 1972

[54] AIR COMPRESSOR PISTON RING

[72] Inventor: Joseph A. Ondraka, Stevensville, Mich.

[73] Assignee: Gast Manufacturing Corporation, Benton Harbor, Mich.

[22] Filed: Nov. 10, 1969

[21] Appl. No.: 875,075

[52] U.S. Cl. .................................... 277/157, 277/198
[51] Int. Cl. ............................... F16j 9/00, F02f 5/00
[58] Field of Search ............... 277/157, 173, 162, 220, 221, 277/138, 155, 194, 216, 156, 188, 161, 141, 198

[56] References Cited

UNITED STATES PATENTS

| | | | |
|---|---|---|---|
| 2,962,332 | 11/1960 | Hale | 277/198 |
| 1,858,173 | 5/1932 | Smittle | 277/157 |
| 2,793,089 | 5/1957 | Anderson | 277/188 X |
| 3,145,629 | 8/1964 | Gottzmann | 277/157 X |
| 3,455,565 | 7/1969 | Sepsen | 277/156 X |

OTHER PUBLICATIONS

The Journal of Teflon, Vol. 6, No. 6, August 1965, pages 4 to 7, by Traub.

*Primary Examiner*—Samuel B. Rothberg
*Attorney*—Price, Heneveld, Huizenga & Cooper

[57] ABSTRACT

An improved oil-less air compressor piston utilizing a lap-joint, self-lubricating, piston ring and a sealing strip, the length of the latter being such that its ends overlap when it is installed within and against the inner surface of the piston ring. The height of the ring and the strip must be less than the height of the piston groove into which they are installed, so that air pressure against the ring causes it to seal against the downstream side of the piston groove and the cylinder wall, and still allows the ring to slowly revolve about the piston so as to distribute wear evenly.

2 Claims, 3 Drawing Figures

PATENTED APR 25 1972

3,658,350

INVENTOR
JOSEPH A. ONDRAKA

BY

Price, Heneveld, Huizenga + Cooper

ATTORNEYS

AIR COMPRESSOR PISTON RING

BACKGROUND OF THE INVENTION

In air compressors utilizing pistons, it is desirable that the piston rings completely and at all times seal against the bore of the cylinder so as to prevent air from leaking around the piston ring. Inasmuch as conventional piston rings utilize a lap-joint, the problem becomes acute as the rings wear and the lap-joint expands so as to provide a larger gap. The problem becomes even more acute in pistons utilizing two rings when the lap-joints of the rings align themselves circumferentially around the piston, as can happen either during the installation or upon use and wear of the piston rings. In the case of such an alignment, rings which are not effectively sealed create a pathway for the air being compressed. It will be apparent that any air leakage has a drastic effect on the efficiency of the compressor and also upon its rated output.

Various attempts to solve the problem have not been successful, because the ring wears unevenly as it is not capable of revolving around the piston. Uneven wear contributes to leaks by the creation of low spots which do not necessarily always mate with the cylinder bore, thus creating a leakage path.

SUMMARY OF THE INVENTION

This invention relates to an oil-less air compressor piston improved so as to effectively seal the piston ring against air leakage despite a great amount of wear experienced by the piston ring. Specifically, the invention provides in an air compressor piston utilizing a self-lubricating piston ring having a lap joint and adapted to be fitted within the groove of the piston so as to bear with the outer surface upon the bore of the cylinder, the improvement comprising means positioned within the inner surface of the ring for sealing the same against leakage, both the sealing means and the ring preferably having a height less than the height of the groove so as to allow the compressed air to press both the means and the ring against the walls of the groove and the cylinder bore, and so as to allow the ring to slowly revolve within the groove to wear the outer surface of the ring evenly.

Accordingly, it is an object of the invention to provide a piston in an air compressor which is effectively sealed against air leakage by means of an improved piston ring and seal combination.

It is a further object of the invention to provide an improved piston of the above character wherein the piston ring is free to slowly rotate around the circumference of the piston.

It is a related object of the invention to provide a piston of the above character wherein the piston ring and its related structure are inexpensive to manufacture.

Other objects and advantages will become apparent upon reference to the following drawings and detailed discussion.

DESCRIPTION OF THE PREFERRED EMBODIMENT

Figure 1:
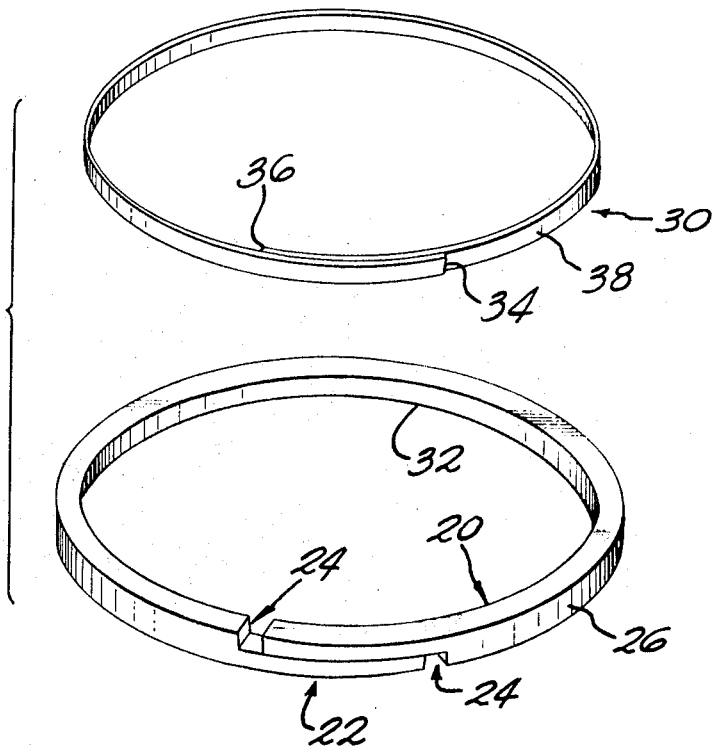
FIG. 1 is an exploded perspective view of the piston ring and the sealing strip comprising the invention.
Figure 3:
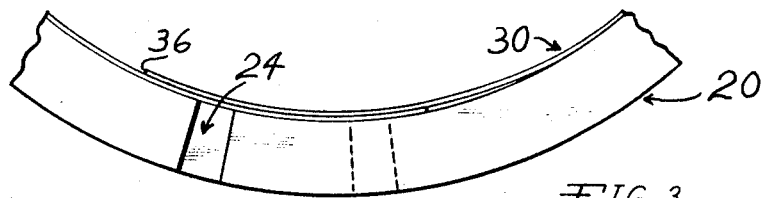
FIG. 3 is a fragmentary plan view of the piston ring and sealing strip of FIG. 1 depicting their assembled relationship.

The invention relates to a piston utilized in an oilless environment, such as one would find in an air compressor. Rather, the invention concerns pistons which have to move large quantities of air or other gases and which operate within the bore 10 of a conventional cylinder 12. Thus, a piston 14 can have one or more grooves 16 within which the piston ring of the invention is to be installed. The piston ring itself comprises a conventional ring 20 of a material, which, because of the lack of oil, must be self-lubricating, such as is obtained by the use of the material "Teflon" or graphite. The piston ring conventionally utilizes a lap-joint generally indicated as 22, wherein each end of the piston ring 20 is stepped-down on alternate sides. Such a joint leaves gaps 24 which, unless sealed, provide a source of leakage when the cylinder moves air. As the outer surface 26 of the piston ring 20 wears, the ring because of its resilient nature expands. That is, when the piston ring 20 is installed it is under compression so as to insure that the surface 26 is biased or expanded against the bore 10 of the cylinder 12.

Figure 2:
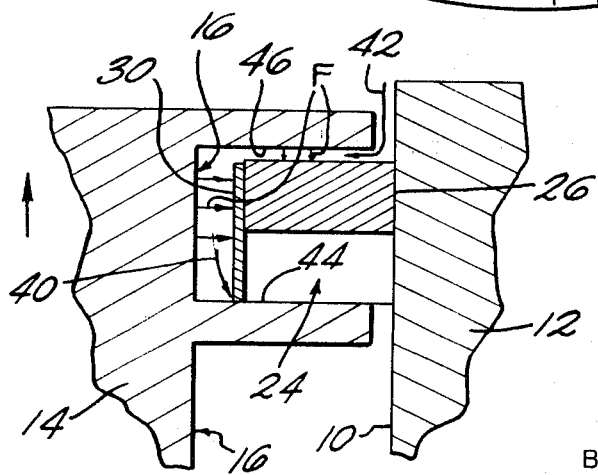
FIG. 2 is a fragmentary sectional view of the piston ring and sealing strip of FIG. 1 installed in the groove of a piston of an air compressor.

In accordance with the invention, to aid in the expansion of the ring and to cover or seal the spaces in the piston ring regardless of the position of the ring within the groove 16 and regardless of the amount of wear surface 26 has experienced, a sealing strip 30 is positioned within the inner surface 32 of the piston ring 20. The length of the strip 30 is such that the ends 34 and 36 of the strip overlap when the strip is in position within the ring. The sealing strip 30 is preferably formed from a thin metallic stock, such as steel, and preferably has a spring-biasing or expander function. The strip 30 must be made thin enough so that the outer surface 38 bears effectively against the inner surface 32 of the piston ring around substantially all the circumference of the piston ring as will be apparent from examination of the operation of the device as illustrated in FIG. 2. That is, the strip 30 serves to prevent air from entering the gap 24 by closing off the passage of the air as indicated by the arrow 40.

To further maintain the effectiveness of the seal of the piston ring 20 and at the same time to allow the piston ring to revolve slowly around the piston 14 within the groove 16 so as to distribute evenly the wear on the surface 26, the height of the piston ring 20 and the sealing strip 30 is less than the height of the groove 16, as shown in FIG. 2. This allows the air during an upward thrust of the piston 14 to enter into the groove 16 by the path indicated at 42, thus creating a force "F" which presses the piston ring 20 and the sealing strip 30 on such upward stroke against the surface 44 of the groove 16 and against the surface 10 of the cylinder 12. Such a pressing of the surfaces together obviously completes the seal by preventing the air from going beyond the path 40, which path is blocked by the sealing strip 30. It will also be apparent that during the downward stroke of the piston 14, the gap between the piston ring and the top surface 46 of the groove allows the piston ring to revolve to some extent, thus insuring even wear over the surface 26 of the piston ring. To further insure that the sealing strip 30 moves down against surface 44 when the piston ring so moves, the height of the strip 30 is preferably substantially the same as the height of the piston ring 20. However, it will be readily apparent that the same result can be obtained if the sealing strip is slightly greater in height than the piston ring.

Although the invention is described in connection with a preferred embodiment, it will be apparent that other embodiments can be constructed which will practice the invention. For example, a system utilizing additional rings could also practice the invention. Accordingly, these embodiments are deemed included unless the language of the following claims expressly provides otherwise.

The embodiments of the invention in which an exclusive property or privilege is claimed are defined as follows.

1. In an air compressor including a piston movable in one direction during its compression stroke and in the opposite direction during its return stroke, said piston having a groove therein; a self-lubricating piston ring adapted to be fitted within said groove of said piston such that an outer surface of said piston ring bears upon the bore of a cylinder in said compressor; said piston ring comprising a lap-joint ring including a gap at each side of said piston ring where the ends of said lap-joint do not meet; a sealing strip positioned within the inner surface of said piston ring for sealing said gaps existing at said lap-joint of said piston ring against leakage during at least a portion of each operating cycle of said compressor; said sealing strip being of substantially less thickness than said piston ring and overlapping at its ends, the thickness of said strip being sufficiently thin to bear effectively against the entire inner surface of said piston ring; said sealing strip and piston ring have a height less than the height of said groove in said piston so as to allow in the compression stroke direction of the piston's travel the compressed air to pass behind said sealing strip and exert a fluid pressure thereagainst causing said sealing strip to press said piston ring against the walls of said cylinder, and so as to allow in the return stroke direction of the piston's travel said piston ring to revolve within said groove to cause even wear of the outer surface of said piston ring during use.

2. An apparatus as defined in claim 1 wherein said sealing means and said ring have substantially the same height.

* * * * *